(12) United States Patent
Mejri et al.

(10) Patent No.: US 10,250,360 B2
(45) Date of Patent: Apr. 2, 2019

(54) METHODS AND DEVICES FOR SUB-BLOCK DECODING DATA SIGNALS

(71) Applicant: INSTITUT MINES-TELECOM, Paris (FR)

(72) Inventors: Asma Mejri, Antibes (FR); Ghaya Rekaya Ben-Othman, Antony (FR); Mohammed-Achraf Khsiba, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/836,162

(22) Filed: Dec. 8, 2017

(65) Prior Publication Data

US 2018/0175971 A1 Jun. 21, 2018

(30) Foreign Application Priority Data

Dec. 19, 2016 (EP) .................................... 16306728

(51) Int. Cl.
*H04B 7/08* (2006.01)
*H04L 1/06* (2006.01)
(Continued)

(52) U.S. Cl.
CPC ......... *H04L 1/0643* (2013.01); *H04B 7/0413* (2013.01); *H04B 7/0891* (2013.01);
(Continued)

(58) Field of Classification Search
CPC ...... H04B 7/0413; H04B 7/08; H04B 7/0891; H04L 1/0631
(Continued)

(56) References Cited

U.S. PATENT DOCUMENTS

2006/0067382 A1* 3/2006 Yedidia ................. H04L 5/0026
375/141
2010/0042666 A1 2/2010 Park et al.

OTHER PUBLICATIONS

European Search Report for 16306728.3 dated May 2, 2017.
(Continued)

*Primary Examiner* — Kevin Kim
(74) *Attorney, Agent, or Firm* — Meagher Emanuel Laks Golberg & Liao, LLP

(57) ABSTRACT

Embodiments of the invention provide a decoder for decoding a signal received through a transmission channel in a communication system, said signal comprising a vector of information symbols, wherein the decoder comprises:
a processing unit (307) configured to determine at least one candidate set of division parameters and to perform a division of said vector of information symbols into a set of sub-vectors in association with each candidate set of division parameters, each pair of sub-vectors being associated with a division metric;
a selection unit (309) configured to select one of said candidate sets of division parameters according to a selection criterion depending on said division metric; and
a decoding unit (311) configured to determine at least one estimate of each sub-vector associated with said selected set of division parameters by applying a symbol estimation algorithm,
wherein the decoder is configured to determine at least one estimate of the vector of information symbols from said at least one estimate of each sub-vector of information symbols.

15 Claims, 6 Drawing Sheets

(51) Int. Cl.
   *H04L 25/03* (2006.01)
   *H04W 4/70* (2018.01)
   *H04B 7/0413* (2017.01)
   *H04W 84/04* (2009.01)

(52) U.S. Cl.
   CPC .. *H04L 25/03191* (2013.01); *H04L 25/03961* (2013.01); *H04W 4/70* (2018.02); *H04L 1/0668* (2013.01); *H04W 84/045* (2013.01)

(58) Field of Classification Search
   USPC .................................. 375/262, 260, 341
   See application file for complete search history.

(56) References Cited

OTHER PUBLICATIONS

W-J Choi, et al: "Combined ML and DFE decoding for the V-BLAST system", IEEE International Conference on Communications, vol. 3, pp. 1243-1248, 2000.

T. P. Ren, et al: "Fast-group-decodable space-time block code", In Proceedings of IEEE Information Theory Workshop, pp. 1-5, Jan. 2010.

K. Pavan Srinath and B. Sundar Rajan, "Low ML-Decoding Complexity, Large Coding Gain, Full-Rate, Full-Diversity STBCs for 2x2 and 4x2 MIMO Systems", IEEE Journal of Selected Topics in Signal Processing, vol. 3, No. 6, pp. 916-927, Dec. 2009.

L. P. Natarajan, K. P. Srinath, and B. Sundar Rajan, "On the Sphere Decoding Complexity of High-Rate Multigroup Decodable STBCs in Asymmetric MIMO Systems", IEEE Transactions on Information Theory, vol. 59, No. 9, Sep. 2013.

\* cited by examiner

METHODS AND DEVICES FOR SUB-BLOCK DECODING DATA SIGNALS

TECHNICAL FIELD

The invention generally relates to digital communication and in particular to methods and devices for decoding a data signal.

BACKGROUND

Multiple-Input Multiple-Output (MIMO) technologies are used in several communication systems to provide high transmission rates. MIMO technologies exploit the space and time dimensions to encode and multiplex more data symbols using a multiplicity of transmit and/or receive antennas, over a plurality of time slots. As a result, the capacity, range, and reliability of a MIMO-based communication system can be enhanced. Exemplary MIMO communication systems comprise wired (e.g. optical fiber-based) and wireless communication systems.

The promise of high data throughput and improved coverage range, reliability and performance is achieved by MIMO systems through the use of multiple transmit and receive antennas for communicating data streams. The use of multiple transmit and receive antennas increases immunity to propagation effects comprising interference, signal fading and multipath.

MIMO systems are based on Space-Time coding and decoding techniques. At transmitter devices, Space-Time encoders are implemented to encode data streams into codewords transmitted thereafter through the transmission channel. At the receiver side, Space-Time decoders are implemented to recover intended data streams conveyed by the transmitter device(s).

Several Space-Time decoding algorithms exist. The choice of the decoding algorithm to be used depends on the target performance and on the implementation complexity and related cost.

In the presence of equally distributed information symbols, optimal Space-Time decoders implement the Maximum Likelihood (ML) decoding criterion. Exemplary ML decoding algorithms comprise the exhaustive search and sequential decoding algorithms such as the Sphere decoder, the Schnorr-Euchner decoder, the Stack decoder, and the SB-Stack decoder. ML decoders provide optimal performances but require a high computational complexity that increases with the number of antennas and the size of the alphabet to which the information symbols belong.

Alternatively, sub-optimal decoding algorithms requiring lower computational complexity than ML decoders, can be used. Exemplary sub-optimal decoding algorithms comprise:
  linear decoders such as the Zero-Forcing (ZF) and the Minimum Mean Square Error (MMSE) decoders; and
  non-linear decoders such as the ZF-DFE decoder.

Both linear and non-linear decoders are based on inter-symbol interference cancellation and estimation of the information symbols individually.

According to another sub-optimal sub-block decoding strategy, the information symbols can be decoded by sub-vectors, i.e. by sub-blocks of symbols. Algorithms implementing a sub-block decoding are based on a division of the vector of information symbols into two or more sub-vectors. Each sub-vector is estimated individually and recursively, given the previously estimated sub-vectors of symbols. The estimation of each sub-vector of symbols is performed using a symbol estimation algorithm. Any sequential, linear or non-linear decoding algorithm may be implemented in a given sub-block as a symbol estimation algorithm to generate the estimate of the corresponding sub-vector of information symbols.

According to QR-based sub-block decoding algorithms, the division of the vector of information symbols is made in accordance with a division of an upper triangular matrix representative of the transmission channel. The upper triangular matrix can be obtained by applying a QR decomposition to a channel matrix representative of the transmission channel.

A QR-based sub-block decoding algorithm is disclosed in "W-J Choi, R. Negi, and J. M. Cioffi, Combined ML and DFE decoding for the V-BLAST system, IEEE International Conference on Communications, Volume 3, pages 1243-1248, 2000". A combination of ML and DFE decoding is therein proposed for wireless MIMO systems using spatial multiplexing of data streams. The vector of information symbols of length n is first divided into two sub-vectors of lengths p and n-p respectively. ML decoding is then used to determine an estimation of the sub-vector comprising p information symbols. Then, using decision feedback equalization, the remaining n-p symbols are estimated after an inter-symbol interference cancellation. The choice of the division parameters, i.e. the number of sub-vectors and the length of each sub-vector, is deterministic.

Other QR-based sub-block decoding algorithms for coded wireless MIMO systems are disclosed for example in:
"K. Pavan Srinath and B. Sundar Rajan, Low ML-Decoding Complexity, Large Coding Gain, Full-Rate, Full-Diversity STBCs for 2×2 and 4×2 MIMO Systems, IEEE Journal of Selected Topics in Signal Processing, Volume 3, Issue 6, pages 916-927, 2009";
"L. P. Natarajan, K. P. Srinath, and B. Sundar Rajan, On The Sphere Decoding Complexity of Gigh-Rate Multigroup Decodable STBCs in Asymmetric MIMO Systems, IEEE Transactions on Information Theory, Volume 59, Issue 9, 2013"; and
"T. P. Ren, Y. L. Guan, C. Yuen, and R. J. Shen. Fast-group-decodable space-time block code. In Proceedings of IEEE Information Theory Workshop, pages 1-5, January 2010".

The division of the upper triangular matrix in these approaches depends on the used Space-Time Block Code (STBC) and in particular to the class to which a STBC may belong.

QR-based recursive sub-block decoding is based on a recursive estimation of sub-vectors of information symbols given the previously estimated sub-vectors. Due to the interference between the various sub-vectors of information symbols, a decoding error on a given sub-vector may propagate over the forthcoming sub-vectors and generate decoding errors. The performances of recursive sub-block decoding algorithms are thus impacted by the interference between the sub-vectors of information symbols.

Existing recursive sub-block decoding algorithms provide better performance than linear and non-linear decoders. However, the division of the vector of information symbols is performed either deterministically or depending on the code used in the coded systems. Further, existing sub-block division criteria do not take into account the interference between the sub-vectors of information symbols and can result in sub-optimal performance/complexity tradeoffs.

There is accordingly a need for sub-block division enabling a reduction of the impact of the interference between the sub-vectors of information symbols that are recursively decoded.

SUMMARY

In order to address these and other problems, there is provided a decoder for decoding a signal received through a transmission channel in a communication system. The signal comprises a vector of information symbols. The decoder comprises:
- a processing unit configured to determine at least one candidate set of division parameters and to perform a division of the vector of information symbols into a set of sub-vectors in association with each candidate set of division parameters. Each pair of sub-vectors is associated with a division metric;
- a selection unit configured to select one of the candidate sets of division parameters according to a selection criterion depending on the division metric; and
- a decoding unit configured to determine at least one estimate of each sub-vector associated with the selected set of division parameters by applying a symbol estimation algorithm.

The decoder is configured to determine at least one estimate of the vector of information symbols from the at least one estimate of each sub-vector of information symbols.

According to some embodiments, the transmission channel may be represented by an upper triangular matrix. In such embodiments, the processing unit may be further configured to determine, for each candidate set of division parameters, a candidate division of the upper triangular matrix into at least two sub-matrices in association with the division of the vector of information symbols, each pair of sub-vectors being further associated with a rectangular sub-matrix from the at least two sub-matrices, the division metric associated with each pair of sub-vectors being derived from the components of the rectangular sub-matrix determined for the candidate set of division parameters.

According to some embodiments, the division metric may be a ratio between:
- the number of the components comprised in the rectangular sub-matrix that have an absolute value lower than or equal to a reference value, the reference value being a positive real number higher than or equal to zero, and
- the total number of components comprised in the rectangular sub-matrix.

In some embodiments, the reference value may be equal to zero.

According to some embodiments, the selection criterion may comprise:
- determining, for each candidate set of division parameters, a reference division metric corresponding to the lowest division metric value among the division metrics associated with the pairs of sub-vectors of the set of sub-vectors associated with the candidate set of division parameters,
- determining, among the candidate sets of division parameters, the candidate set of division parameters that has the highest value of the reference division metric.

Further, in some embodiments, the selection criterion may comprise selecting the candidate set of division parameters which is associated with a maximum number of division metrics that satisfy a metric condition related to a metric threshold, the metric condition being satisfied for a given division metric associated with a pair of sub-vectors if the given division metric is higher than or equal to said metric threshold.

In some embodiments, the metric threshold may be different for each pair of sub-vectors.

In other embodiments, the metric threshold may be the same for each pair of sub-vectors.

Moreover, in some embodiments, the metric threshold may be selected depending on a signal-to-noise ratio and/or on a transmission rate.

Furthermore, according to some embodiments, the processing unit may be configured to determine the at least one candidate set of division parameters iteratively, an iteration comprising:
- determining a current candidate set of division parameters. A division of the vector of information symbols into a set of sub-vectors may be performed for the determined current candidate set of division parameters; and
- updating the current candidate set of division parameters by modifying at least one of the division parameters of the current candidate set of division parameters.

According to some embodiments, the step of modifying at least one of the division parameters of the current candidate set of division parameters may comprise increasing or decreasing at least one of the division parameters.

In some embodiments, the processing unit may be configured to previously determine an initial candidate set of division parameters, the current set of division parameters being initially set to the initial candidate set of division parameters.

According to some embodiments, the set of division parameters may comprise:
- at least two sub-vectors of information symbols, and/or
- a length parameter for each sub-vector of information symbols, said length parameter being at least equal to one and representing the number of information symbols comprised in the sub-vector of information symbols.

According to some embodiments, the decoding unit may be configured to apply a different symbol estimation algorithm for determining the at least one estimate of each sub-vector of information symbols.

There is also provided a method for decoding a signal received through a transmission channel in a communication system. The signal comprises a vector of information symbols. The method comprises:
- determining at least one candidate set of division parameters and performing a division of the vector of information symbols into a set of sub-vectors in association with each candidate set of division parameters, each pair of sub-vectors being associated with a division metric;
- selecting one of the candidate sets of division parameters according to a selection criterion depending on said division metric; and
- determining at least one estimate of each sub-vector associated with the selected set of division parameters by applying a symbol estimation algorithm.

The method may further comprise determining the at least one estimate of the vector of information symbols from the at least one estimate of each sub-vector of information symbols.

Advantageously, the various embodiments allow for sub-block division that adapts the division of the vector of information symbols to the symbol estimation algorithms. The sub-block division according to certain embodiments further advantageously enables a reduction of the propagation of decoding errors on sub-vectors of information symbols. As a result, decoding error performance is improved.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention and, wherein.

DETAILED DESCRIPTION

Embodiments of the present invention provide devices, methods, and computer program products for sub-block decoding a vector of information symbols received through a transmission channel in a communication system with an optimized tradeoff between the decoding performances and the decoding computational complexity. The transmission channel is represented by an upper triangular matrix obtained by applying a QR decomposition to a channel matrix representative of the transmission channel.

Embodiments of the present invention provide an optimized division of the upper triangular matrix according to a selection criterion enabling a reduction of the estimation errors on sub-vectors of information symbols that are due to error propagation through the interference between the sub-vectors of information symbols.

Devices, methods, and computer program products according to the various embodiments may be implemented in different types of systems. In particular, they may be implemented in communication systems to determine an estimate of a vector of information symbols conveyed from one or many transmitter devices to a receiver device.

The following description of some embodiments will be made with reference to communication systems, for illustration purpose only. However, the skilled person will readily understand that embodiments may be applied to other types of systems such as for example signal processing systems, cryptographic systems, and positioning systems.

Figure 1:
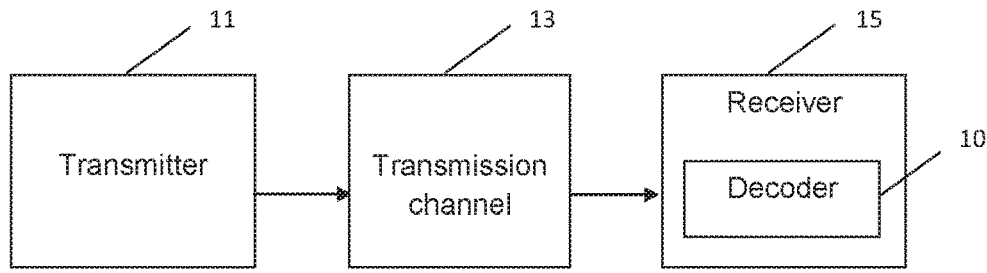
FIG. 1 is a block diagram of an exemplary application of the invention to communication systems, according to some embodiments.

FIG. 1 is a block diagram of an exemplary application to a communication system 100, according to some embodiments. The communication system 100 may be wired (e.g. optical fiber-based) or wireless. The communication system 100 may comprise at least one transmitter device 11 (hereinafter referred to as a "transmitter") configured to transmit a plurality of information symbols to at least one receiver device 15 (hereinafter referred to as "receiver") through a transmission channel 13. The receiver 15 may include at least one decoder 10 to decode the information symbols sent by one or more transmitter devices 11. The transmission channel 13 may be any wired connection (e.g. optical fiber-based link) or wireless medium.

In an application of the invention to radio communications, the communication system 100 may be a wireless single-user MIMO system comprising a wireless transmitter device 11 configured to communicate a flow of information symbols representing an input data and a wireless receiver device 15, configured to decode the conveyed symbols by the transmitter 11.

The transmitter device 11 may be equipped with one or more transmit antennas and the receiver device 15 may be equipped with one or more receive antennas, the number $n_t$ of transmit antennas and the number $n_r$ of receive antennas being greater than one.

In another application of the invention to radio communications, the communication system 100 may be a wireless multi-user MIMO system in which a plurality of wireless transmitter devices 11 and receiver devices 15 communicate with each other. In such embodiments, the communication system 100 may further use, alone or in combination, any multiple access technique such as Time Division Multiple Access (TDMA), Frequency Division Multiple Access (FDMA), Code Division Multiple Access (CDMA), and Space-Division Multiple Access (SDMA).

In an application of the invention to optical communications, the communication system 100 may be an optical fiber-based communication system. The transmitter 11 and receiver 15 may be accordingly any optical transceiver capable of operating in optical fiber-based transmission systems. The transmission channel 13 may be any optical fiber link designed to carry data over short or long distances Exemplary applications using optical fiber links over short distances comprise high-capacity networks such as data center interconnections. Exemplary applications using optical fiber links over long distances comprise terrestrial and transoceanic transmissions. In such embodiments, the information symbols conveyed by the transmitter 11 may be carried by optical signals polarized according to the different polarization states of the fiber. The optical signals propagate along the fiber-based transmission channel 11, according to one or more propagation modes, until reaching the receiver 15.

In another application of the invention to optical communications, the optical signal carrying the information symbols may be generated using a single wavelength lasers.

In other embodiments, wavelength division multiplexing (WDM) techniques may be used at the transmitter 11 to enable generating optical signals using a plurality of independent wavelengths.

In still another application of the invention to optical communication systems using multi-mode fibers, space division multiplexing techniques may be used to multiplex the information symbols according to the various propagation modes.

Further, a multiple access technique such as WDMA (Wavelength Division Multiple Access) may be used in some applications of the invention to optical communication systems.

The transmission channel 13 may be any linear Additive White Gaussian Noise (AWGN) channel or a multipath channel using single-carrier or multi-carrier modulation formats such as OFDM (Orthogonal Frequency Division Multiplexing) and FBMC (Filter Bank Multi-Carrier) for mitigating frequency-selectivity, interference and delays.

In an application of the invention to wireless single-user MIMO systems, the complexity/performance tradeoff of QR-based sub-block decoding of a received signal may be optimized through an optimization of the sub-block division of the vector of information symbols taking into account the interference inter sub-vectors. Exemplary applications of the decoding methods and devices include, with no limitation, MIMO decoding in configurations that may be implemented in:

power-line wired communications standardized in the ITU G.hn and HomePlug AV2 specifications;

wireless standards such as the Wi-Fi (IEEE 802.11n and IEEE 802.11ac), the cellular WiMax (IEEE 802.16e), the cooperative WiMax (IEEE 802.16j), the Long Term Evolution (LTE), the LTE-advanced, and the 5G ongoing standardization.

For illustration purposes only, the following description will be made with reference to a wireless single-user MIMO system accommodating a transmitter device 11 equipped with $n_t \geq 1$ transmit antennas and a receiver device 15 equipped with $n_r \geq 1$ receive antennas for decoding information symbols sent by the transmitter 11. However, the skilled person will readily understand that embodiments of the invention apply to other communication systems such as wireless multi-user MIMO systems and optical MIMO systems. More generally, the invention may be applied to any communication system characterized by a linear representation (equivalently a lattice representation) of the channel output at receiver devices. In addition, although not limited to such embodiments, the invention has particular advantages in the presence of a number of transmit antennas greater than or equal to two ($n_t \geq 2$) and/or a number of receive antennas greater than or equal to two ($n_r \geq 2$).

Figure 2:
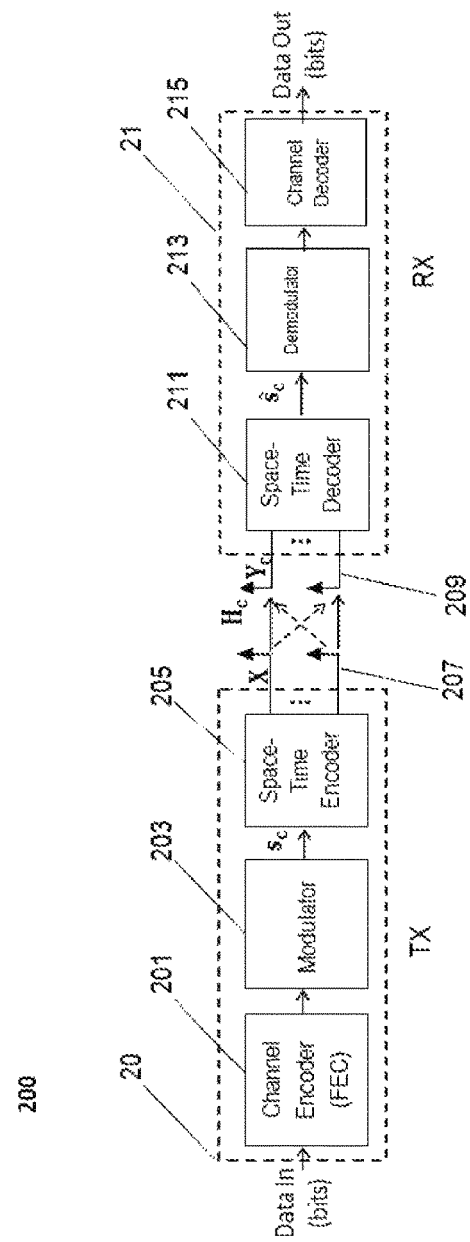
FIG. 2 is a block diagram of an exemplary application of the invention to wireless single-user MIMO systems, according to some embodiments.

Referring to FIG. 2, there is shown an exemplary wireless single-user MIMO communication system 200 in which various embodiments of the present invention may be implemented. The wireless single-user MIMO communication system 200 may comprise a transmitter 20 implementing a Space-Time Block Code (STBC) to multiplex the information symbols over time and space dimensions. Each transmitter 20 of a station may exchange data with a receiver 21 of another station according to the wireless communication system 200.

The wireless single-user MIMO communication system 200 may present a symmetric configuration. As used herein, a symmetric configuration refers to a configuration in which the transmitter 20 and the receiver 21 are equipped with the same number of antennas $n_t = n_r$. Alternatively, the MIMO configuration may be asymmetric, the number $n_r$ of receive antennas differing from the number $n_t$ of transmit antennas. In particular, in one embodiment, in order to avoid a rank deficiency problem, the number $n_r$ of receive antennas may be larger than the number $n_t$ of antennas at the transmitter. Exemplary asymmetric MIMO configurations comprise 2×4 ($n_t=2$, $n_r=4$) and 4×8 ($n_t=4$, $n_r=8$) supported for example in the LTE standard.

The transmitter 20 may convey a signal to a receiver 21 over a noisy wireless MIMO channel represented by a channel matrix $H_c$. The transmitter 20 may be implemented in different devices or systems capable of operating in wireless environments. Exemplary devices adapted for such applications comprise mobile phones, drones, laptops, tablets, robots, IoT (Internet of Things) devices, base stations, etc. The transmitter 20 may be fixed or mobile. It may comprise for example:

a channel encoder 201 implementing a Forward Error Correction (FEC) code such as a linear block code or a convolutional code;

a modulator 203 implementing a modulation scheme such as Quadrature Amplitude Modulation (QAM) delivering a modulated symbol vector $s_c$;

a Space-Time encoder 205 for delivering a codeword matrix X;

$n_t$ transmit antennas 207, each transmit antenna being associated with a single-carrier or a multi-carrier modulator such as an OFDM or an FBMC modulator.

The transmitter 20 may be configured to encode a received flow of information bits as data input using a FEC encoder 201 implementing for example a linear block code or a convolutional code. The encoded binary signal may be then modulated into a symbol vector $s_c$ using the modulator 203. Different modulation schemes may be implemented such as $2^q$-QAM or $2^q$-PSK with $2^q$ symbols or states. The modulated vector $s_c$ may be a complex-value vector comprising $\kappa$ complex-value symbols $s_1, s_2, \ldots, s_\kappa$ with q bits per symbol.

An information symbol $s_j$ has a mean power $E_s$, and can be written in the form:

$$s_j = Re(s_j) + iIm(s_j) \qquad (1)$$

In equation (1), i denotes the complex number such that $i^2 = -1$ and the $Re(\cdot)$ and $Im(\cdot)$ operators output respectively the real and imaginary parts of an input value.

When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet $A=[-(q-1), (q-1)]$. The minimum distance $d_{min}$ of a modulation scheme represents the Euclidean distance between two adjacent points in the constellation and is equal to 2 in such example.

A Space-Time Encoder 205 may be used to generate a codeword matrix X from the encoded symbols. The Space-Time Encoder 205 may use a linear STBC of length T and may deliver a codeword matrix X of dimension $n_t \times T$ that belongs to a codebook C and is sent over T time slots. The coding rate of such codes is equal to $\kappa/T$ complex symbols per channel use, where $\kappa$ is the number of encoded complex-value symbols composing the vector $s_c = [s_1, s_2, \ldots, s_\kappa]^t$ of dimension $\kappa$ in this case. When full-rate codes are used, the Space-Time Encoder 205 encodes $\kappa = n_t T$ complex-value symbols. Examples of STBCs are the Perfect Codes. The Perfect Codes provide full coding rates by encoding a number $\kappa = n_t^2$ ($T = n_t$) of complex information symbols and satisfy a non-vanishing determinant property.

In some embodiments, the Space-Time Encoder 205 may use a spatial multiplexing scheme known as V-BLAST scheme by multiplexing the received complex-value information symbols over the different transmit antennas, without performing a coding in the time dimension.

The codeword thus constructed may be converted from the time domain to the frequency domain using a multicarrier modulation technique, using for example OFDM or FBMC modulators, and spread over the transmit antennas 207. Signals may be sent from the transmit antennas 207 after optional filtering, frequency transposition and amplification.

The receiver 21 may be configured to receive and decode a signal communicated by the transmitter 20 in a wireless network through a transmission channel (also referred to as a "communication channel") subject to fading and interference and represented by a complex-value channel matrix $H_c$.

In addition, the communication channel may be noisy, affected for example by a Gaussian Noise.

The receiver 21 may be integrated in a base station such as a Node-B in a cellular network, an access point in a local area network or ad-hoc networks or any other interfacing device operating in a wireless environment. The receiver 21 may be fixed or mobile. In one exemplary embodiment, the receiver 21 may comprise:

- a Space-Time decoder 211 configured to deliver, from the channel matrix $H_c$ and the channel output signal $Y_c$, an estimation $\hat{s}_c$ of the modulated symbol vector $s_c$;
- a demodulator 213 configured to generate a binary sequence by performing a demodulation of the estimated symbol vector $\hat{s}_c$;
- a channel decoder 215 configured to deliver, as an output, a binary signal which is an estimation of the transmitted bits, using for example the Viterbi algorithm.

The receiver 21 implements a reverse processing of the processing performed by the transmitter 20. Accordingly, if a single-carrier modulation is used at the transmitter rather than a multi-carrier modulation, then the $n_r$ OFDM of FBMC demodulators may be replaced by corresponding single-carrier demodulators.

Figure 3:
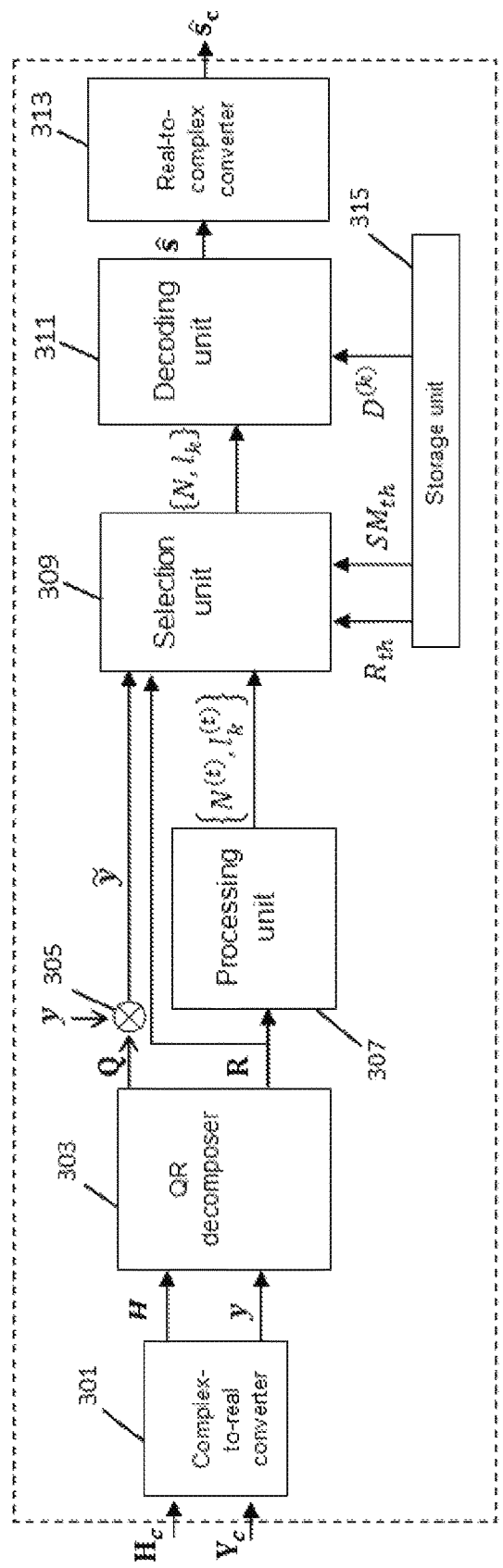
FIG. 3 is a block diagram representing the structure of a Space-Time decoder, according to some embodiments.

FIG. 3 represents the architecture of the Space-Time decoder 211 according to some embodiments. The Space-Time decoder 211 may comprise a complex-to-real converter 301 configured to convert the complex-value channel matrix $H_c$ into a real-value equivalent channel matrix H, and convert the complex-value channel output $Y_c$ into a real-value vector y of dimension n.

The Space-Time decoder 211 may comprise a QR decomposer 303 configured to generate an orthogonal matrix Q and an upper triangular matrix R by applying a QR decomposition to the real-value channel matrix such that H=QR. The components of the upper triangular matrix are denoted by $R_{ij}$.

The Space-Time decoder 211 may comprise a multiplication unit 305 configured to determine an auxiliary signal $\tilde{y}$ by scaling the real-value signal y by the transpose of the orthogonal matrix Q obtained from the QR decomposition of the real-value channel matrix such that $\tilde{y}=Q^t y$.

In an application of the invention to recursive sub-block decoding, the auxiliary signal $\tilde{y}$ and the upper triangular matrix R may be used in the decoding process.

In such applications, the Space-Time decoder 211 may further comprise a processing unit 307 configured to determine at least one candidate set of division parameters denoted by $\{N^{(t)}, l_k^{(t)}\}$ for t=1, . . . , tmax, with tmax being a predefined number designating the number of candidate sets of division parameters.

In the following description, variables such as vectors, matrices, and metrics, expressed using the script t are associated with the candidate set of division parameters $\{N^{(t)}, l_k^{(t)}\}$, which means that the vectors, matrices and metrics expressed using the script t correspond to a division of the auxiliary signal $\tilde{y}$ and the upper triangular matrix R using the candidate set of division parameters $\{N^{(t)}, l_k^{(t)}\}$.

A candidate set of division parameters may comprise a number of sub-vectors $N^{(t)}$ at least equal to two (referred to as "candidate number of sub-vectors"), and a length parameter $l_k^{(t)}$ (also referred to as simply as "length" or "candidate length" hereinafter) designating the length of each sub-vector $s^{(k,t)}$ (referred to as "candidate length"). More specifically, the candidate length represents the number of information symbols comprised in the sub-vector $s^{(k,t)}$ associated with the candidate set of division parameters of index t. The set of candidate lengths satisfy the equation $\Sigma_{k=1}^{N^{(t)}} l_k^{(t)} = n$.

The processing unit 307 may be configured to perform, for each candidate set of division parameters $\{N^{(t)}, l_k^{(t)}\}$, a division of the real-value vector of information symbols s into $N^{(t)}$ sub-vectors such that:

$$s = \begin{pmatrix} s_1 \\ s_2 \\ \vdots \\ s_n \end{pmatrix} = \begin{pmatrix} s^{(1,t)} \\ \vdots \\ s^{(N^{(t)},t)} \end{pmatrix} \qquad (2)$$

For a candidate set of division parameters of index t, the $k^{th}$ sub-vector $s^{(k,t)}$ comprises $l_k^{(t)}$ symbols such that:

$$s^{(1,t)} = \begin{pmatrix} s_1 \\ \vdots \\ s_{l_1^{(t)}} \end{pmatrix}; s^{(k,t)} = \begin{pmatrix} s_{\sum_{m=1}^{k-1} l_m^{(t)}+1} \\ \vdots \\ s_{l_k^{(t)}+\sum_{m=1}^{k-1} l_m^{(t)}+1} \end{pmatrix} \text{ for } k \geq 2 \qquad (3)$$

The processing unit 307 may be further configured to determine, for each candidate set of division parameters $\{N^{(t)}, l_k^{(t)}\}$, a candidate division of the real-value upper triangular matrix R into $N^{(t)}$ upper triangular sub-matrices, denoted by $R^{(k,t)}$, and $$\frac{N^{(t)}(N^{(t)}-1)}{2}$$

rectangular sub-matrices, denoted by $B^{(j,k,t)}$, in association with the division of the vector of information symbols in equation (3) such that:

$$R = \begin{bmatrix} R_{11} & \cdots & R_{1,n-1} & R_{1n} \\ 0 & \vdots & \vdots & \vdots \\ 0 & 0 & R_{n-1,n-1} & R_{n-1,n} \\ 0 & 0 & 0 & R_{nn} \end{bmatrix} = \qquad (4)$$

$$\begin{bmatrix} R^{(1,t)} & \cdots & B^{(1N^{(t)}-1,t)} & B^{(1N^{(t)},t)} \\ 0 & \cdots & \vdots & \vdots \\ 0 & 0 & R^{(N^{(t)}-1,t)} & B^{(N^{(t)}-1N^{(t)},t)} \\ 0 & 0 & 0 & R^{(N^{(t)},t)} \end{bmatrix}$$

According to the candidate divisions of equations (3) and (4), each pair of sub-vectors may be associated with a rectangular sub-matrix among the $$\frac{N^{(t)}(N^{(t)}-1)}{2}$$

rectangular sub-matrices. More specifically, each pair of sub-vectors $s^{(j,t)}$ and $s^{(k,t)}$ for k>j may be associated with the rectangular sub-matrix $B^{(j,k,t)}$.

In applications of the invention to recursive sub-block decoding, the rectangular sub-matrices may correspond to the interference between the various sub-vectors of information symbols. More specifically, the rectangular sub-matrix $B^{(jk,t)}$ may correspond to the interference between the sub-vector $s^{(j,t)}$ and the sub-vector $s^{(k,t)}$ for k>j.

The decoding of the sub-vector $s^{(j)}$ depends on the determined estimates on the sub-vectors $s^{(j,t)}$ for j=k+1, ..., $N^{(t)}$. In particular, any error on the estimation of the sub-vector $s^{(j,t)}$ for j=k+1, ..., $N^{(t)}$ may induce an error on the estimation of the sub-vector $s^{(k,t)}$. The error propagation due to the interference between the sub-vectors $s^{(j,t)}$ and $s^{(k,t)}$ for k>j depends on the structure of the rectangular sub-matrix $B^{(jk,t)}$. In particular, the error propagation depends on the zero structure of the rectangular sub-matrices $B^{(jk,t)}$. The lower the number of zeros comprised in the rectangular sub-matrices, the lower the error propagation, and the better the decoding error performances.

The various embodiments of the invention provide sub-block division techniques enabling, for a given channel representative upper triangular matrix, a minimization of the impact of the interference between the recursively decoded sub-vectors of information symbols. Such sub-block division techniques are based on a division metric representing the zero structure of the rectangular sub-matrices.

According to some embodiments, the processing unit 307 may be configured to associate a division metric with each pair of sub-vectors, the division metric being derived from the components of the upper triangular matrix. In particular, the processing unit 307 may be configured to associate a division metric denoted by $SM^{(t)}(s^{(j,t)}, s^{(k,t)})$ with each pair of sub-vectors $(s^{(j,t)}, s^{(k,t)})$, the division metric $SM^{(t)}(s^{(j,t)}, s^{(k,t)})$ being derived from the components of the rectangular sub-matrix $B^{(jk,t)}$.

According to some embodiments, the division metric $SM^{(t)}(s^{(j,t)}, s^{(k,t)})$ derived from a rectangular sub-matrix $B^{(jk,t)}$ may be defined as the ratio between:
the number of components comprised in the rectangular sub-matrix $B^{(jk,t)}$ having an absolute value lower than or equal to a reference value $R_{th}$, and
the total number of components comprised in the rectangular sub-matrix $B^{(jk,t)}$.

The reference value $R_{th}$ may be any positive real number higher than or equal to zero (0).

The reference value $R_{th}$ may be stored in a storage unit 315 comprised in the Space-Time decoder 211.

In one embodiment, the reference value $R_{th}$ may be equal to zero (0). In such embodiments, the division metric $SM^{(t)}(s^{(j,t)}, s^{(k,t)})$ referred to as a 'hard sparsity rate', corresponds to the ratio between the number of zero-value components comprised in the rectangular sub-matrix $B^{(jk,t)}$ and the total number of components comprised in the rectangular sub-matrix $B^{(jk,t)}$.

In other embodiments in which the division metric $SM^{(t)}(s^{(j,t)}, s^{(k,t)})$ is referred to as 'soft sparsity rate', the reference value $R_{th}$ may be a non-zero positive real number.

According to some embodiments, the reference value $R_{th}$ may be the same for all the pairs of sub-vectors $(s^{(j,t)}, s^{(k,t)})$, i.e. the same for all the rectangular sub-matrices $B^{(jk,t)}$ for $1 \leq j < k \leq N^{(t)}$.

In other embodiments, the reference value $R_{th}$ may be different for at least some of the pairs of sub-vectors $(s^{(j,t)}, s^{(k,t)})$, i.e. for at least some of the rectangular sub-matrices $B^{(jk,t)}$ for $1 \leq j < k \leq N^{(t)}$.

According to some embodiments, the processing unit 307 may be further configured to determine the one or more candidate set(s) of division parameters by performing an iterative processing consisting of a maximum number of iteration denoted by tmax. In such embodiments, the processing unit 307 may be further configured to determine the at least one candidate set of division parameters $\{N^{(t)}, l_k^{(t)}\}$ for t=1, ..., tmax by iteratively:
determining a current candidate set of division parameters $\{N^{(t)}, l_k^{(t)}\}$ associated with a current division of the vector of information symbols into a current candidate number of sub-vectors, and
updating the current candidate set of division parameters by modifying at least one of the division parameters of the current candidate set of division parameters.

The processing unit 307 may be accordingly configured to perform tmax iterations, each iteration providing a current candidate set of division parameters corresponding to one candidate set of division parameters.

The processing unit 307 may be configured to update a current candidate set of division parameters by increasing or decreasing the current candidate number of sub-vectors $N^{(t)}$ and/or increasing or decreasing the number of information symbols $l_k^{(t)}$ comprised in at least one sub-vector $s^{(j,t)}$.

According to some embodiments, the processing unit 307 may be configured to increase or decrease the number of information symbols $l_k^{(t)}$ comprised in a current candidate set of division parameters, using an integer number referred to as a 'fitting parameter' and denoted $p_k$. The fitting parameters may be positive-value or negative-value such that $1 \leq |p_k| \leq n-1$. Accordingly, the operation of increasing (respectively of decreasing) the number of information symbols $l_k^{(t)}$ may correspond to the operation $l_k^{(t)} = l_k^{(t-1)} + |p_k|$ (respectively $l_k^{(t)} = l_k^{(t-1)} - |p_k|$).

Given that the total number of information symbols comprised in the vector s is constant and that the lengths $l_k^{(t)}$ satisfy the condition $\Sigma_{k=1}^{N^{(t)}} l_k^{(t)} = n$, the fitting parameters $p_k$ meet the condition $\Sigma_{k=1}^{N^{(t)}} p_k = 0$.

A candidate number of sub-vectors $N^{(t)}$ may be updated according to the update of the lengths of sub-vectors. For example, in embodiments where a length of a sub-vector is updated to a zero value, the candidate number of sub-vectors may be decreased by one (1).

In some embodiments, the processing unit 307 may be configured to determine an initial candidate set of division parameters, denoted by $\{N^{(0)}, l_k^{(0)}\}$, associated with an initial division of the vector of information symbols into $N^{(0)}$ initial sub-vectors and to determine at least one current candidate set of division parameters from said initial candidate set of division parameters. The $N^{(0)}$ number of initial sub-vectors is at least equal to two.

In such embodiments, the processing unit 307 may be configured to iteratively determine a current candidate set of division parameters by iteratively increasing or decreasing the number of the initial sub-vectors and/or increasing or decreasing at least one length of an initial sub-vector.

In some embodiments, the storage unit 315 may be configured to store one or more symbol estimation algorithms. In such embodiments, the processing unit 307 may be configured to determine the initial candidate set of division parameters depending on said one or more symbol estimation algorithms.

For example, in embodiments in which the symbol estimation algorithms comprise one or more linear or non-linear decoding algorithms, the initial candidate set of division parameters may comprise a number of sub-vectors equal to $N^{(0)} = n$, providing an initial division of the vector s into n sub-vectors such that the length of each sub-vector is equal to $l_k^{(0)} = 1$, for k=1, ..., n. Such an initial set of division parameters may advantageously enable reducing the computational decoding complexity.

In another example, in embodiments in which the symbol estimation algorithms comprise one or more sequential decoding algorithms, the initial candidate set of division parameters may comprise a number of sub-vectors equal to $N^{(0)}=1$ providing a single sub-vector of length $l_1^{(0)}=n$. Such an initial candidate set of division parameters may advantageously enable improving the decoding error performance.

The Space-Time decoder 211 may comprise a selection unit 309 configured to select one set of division parameters, denoted by $\{N,l_k\}$, among the determined candidate set(s) of division parameters according to a selection criterion. The selection criterion may depend on the division metrics associated with the pairs of sub-vectors of information symbols.

According to some embodiments, the selection criterion may be based on a maximization of the division metrics $SM^{(t)}(s^{(j,t)}, s^{(k,t)})$ associated with all the rectangular sub-matrices provided by the candidate sets of division parameters. In particular, the selection unit 309 may be configured to:

- determine, for each candidate set of division parameters $\{N^{(t)},l_k^{(t)}\}$, a reference division metric corresponding to the lowest division metric value among the division metrics associated with the pairs of sub-vectors $(s^{j,t}, s^{(k,t)})$ for $1 \leq j < k \leq N^{(t)}$ associated with the candidate set of division parameters $\{N^{(t)},l_k^{(t)}\}$, and
- determine, among the candidate sets of division parameters $\{N^{(t)},l_k^{(t)}\}$ for $t=1, \ldots, \text{tmax}$, the candidate set of division parameters $\{N,l_k\}$ that has the highest value of the reference division metric.

Accordingly, the selection unit 309 may be configured to select the candidate set of division parameters $\{N,l_k\}$ such that the minimum value of the division metrics $SM^{(t)}(s^{(j,t)}, s^{(k,t)})$ associated with each pair of sub-vectors $(s^{(j,t)}, s^{(k,t)})$ is maximized according to:

$$\{N,l_k\} = \operatorname{argmax}_{t=1,\ldots,tmax}\{\min_{1 \leq j<k \leq N^{(t)}} SM^{(t)}(s^{(j,t)},s^{(k,t)})\} \quad (5)$$

The selected set of division parameters enables to maximize, over all the candidate sets of division parameters, the minimum value of the division metric, considering all the division metrics associated with all the pairs of sub-vectors associated with each candidate set of division parameters.

According to other embodiments, the selection criterion may depend on the value of the division metrics $SM^{(t)}(s^{(j,t)}, s^{(k,t)})$ with respect to a division metric threshold, denoted by $SM_{th}$, which may be stored in the storage unit 315. More specifically, the selection criterion may comprise selecting the candidate set of division parameters, which is associated with a maximal number of division metrics that satisfy a metric condition related to the division metric threshold. For a given division metric associated with a pair of sub-vectors, the metric condition may be satisfied if said given division metric is higher than or equal to said metric threshold.

Accordingly, the selection unit 309 may be configured to select the set of division parameters $\{N,l_k\}$ associated with a division of the vector of information symbols such that the number of the division metrics $SM^{(t)}(s^{(j,t)}, s^{(k,t)})$ being higher than or equal to a division metric threshold is maximized over all the candidate sets of division parameters according to:

$$\{N,l_k\} = \operatorname{argmax}_{t=1,\ldots,tmax}\{\operatorname{Card}(SM^{(t)}(s^{(j,t)},s^{(k,t)}) \geq SM_{th}; 1 \leq j<k \leq N^{(t)})\} \quad (6)$$

In equation (6), Card(X) designates the number of elements in a set X.

A division metric threshold may indicate a minimum or a sufficient 'sparsity rate' of the rectangular sub-matrices enabling to minimize the impact of the interference between the sub-vectors of information symbols and/or to reach a required or a target quality of service specification when applied to recursive sub-block decoding.

According to some embodiments, the Space-Time decoder 211 may be configured to previously determine a division metric threshold depending on a standard deviation of the noise affecting the transmission channel.

In one embodiment, the division metric threshold may be the same for the division metrics $SM^{(t)}(s^{(j,t)}, s^{(k,t)})$, associated with all the pairs of sub-vectors $(s^{(j,t)}, s^{(k,t)})$ for $1 \leq j < k \leq N^{(t)}$.

In another embodiment, the division metric threshold may be different for at least some of the division metrics $SM^{(t)}(s^{(j,t)}, s^{(k,t)})$ associated with at least some pairs of sub-vectors $(s^{(j,t)}, s^{(k,t)})$ for $1 \leq j<k \leq N^{(t)}$.

For example, the division metric threshold may depend on the position of the sub-vectors $s^{(j,t)}$ and/or $s^{(k,t)}$ within the real-value vector of information symbols s. Accordingly, for example, a large value (respectively a small value) of a division metric threshold may be considered for the division metrics associated with) the pairs of sub-vectors $(s^{(j,t)}, s^{(k,t)})$ of indices $$\frac{n}{2} \leq j < k \leq N^{(t)}$$

(respectively of indices $$1 \leq j < k \leq \frac{n}{2}).$$

Given the selected set of division parameters $\{N,l_k\}$, a recursive sub-block decoding may be performed. The selected set of division parameters is associated with a division of the vector s into N sub-vectors such that $$s = \begin{pmatrix} s_1 \\ s_2 \\ \vdots \\ s_n \end{pmatrix} = \begin{pmatrix} s^{(1)} \\ \vdots \\ s^{(N)} \end{pmatrix}.$$

Accordingly, the Space-Time decoder 211 may comprise a decoding unit 311 configured to determine at least one estimate $\hat{s}^{(k)}$ of each sub-vector of information symbols $s^{(k)}$ by applying a symbol estimation algorithm $D^{(k)}$. An estimate $\hat{s}$ of the real-value vector of symbols s may be determined from the various estimates $\hat{s}^{(k)}$, $k=1, \ldots, N$ of the sub-vectors of information symbols such that $$\hat{s} = \begin{pmatrix} \hat{s}^{(1)} \\ \vdots \\ \hat{s}^{(N)} \end{pmatrix}.$$

According to some embodiments, the Space-Time decoder 211 may further comprise a storage unit 315 configured to store one or more symbol estimation algorithms. In such embodiments, the decoding unit 311 may be configured to select similar or different symbol estimation algorithms $D^{(k)}$ for k=1, ..., N from said one or more symbol estimation algorithms.

In some embodiments, the symbol estimation algorithms may comprise any sequential algorithm, a linear decoding algorithm such as the ZF decoder or the MMSE decoder, or a non-linear ZF-DFE decoder.

In some embodiments, the Space-Time decoder 211 may be configured to previously determine the symbol estimation algorithm(s) depending on a signal-to-noise ratio and/or on a given value of the decoding computational complexity that can be supported by the receiver device 15 implementing the decoding algorithm and/or with respect to a target quality of service metric that needs to be satisfied.

According to some embodiments, the target quality of service metric may be related to the outage capacity of the transmission channel and/or to the achievable transmission rate.

The Space-Time decoder 211 may further comprise a real-to-complex converter 313 configured to deliver a complex-value vector $\hat{s}_c$ as an estimate of the original vector of complex-value symbols $s_c$.

Figure 4:
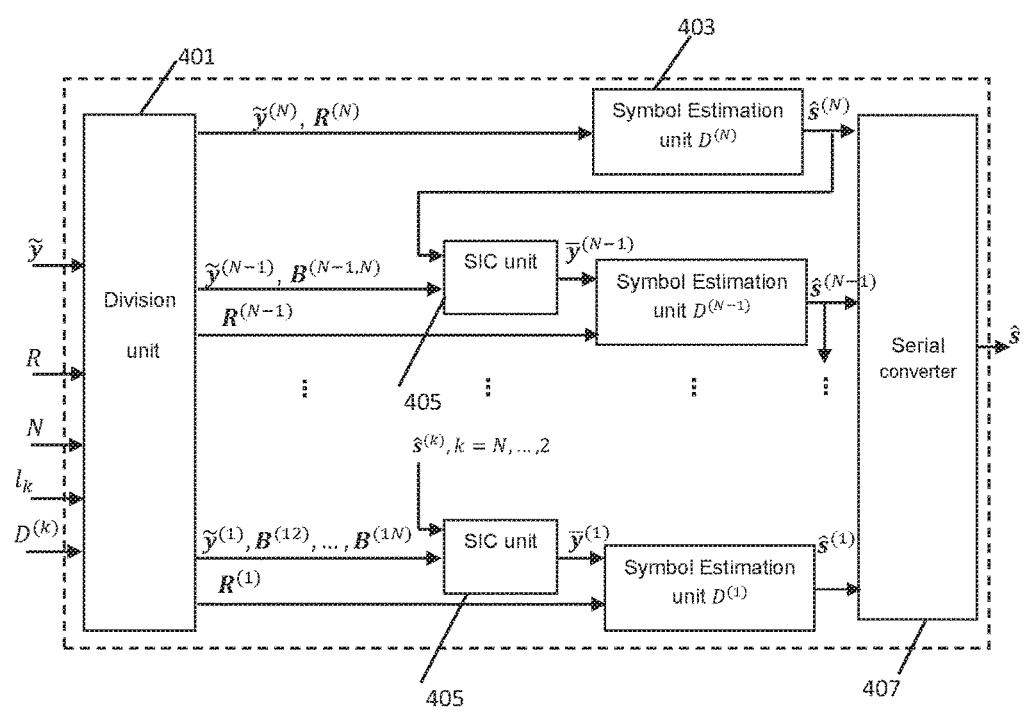
FIG. 4 is a block diagram representing the structure of a decoding unit, according to some embodiments.

FIG. 4 illustrates a structure of the decoding unit 311 according to some embodiments in an application of the invention to QR-based recursive sub-block decoding. As illustrated in FIG. 4, the decoding unit 311 may comprise a division unit 401 configured to:

divide the vectors s and $\tilde{y}$ into N sub-vectors $s^{(k)}$ and $\tilde{y}^{(k)}$ respectively, for k=1, ..., N, where a sub-vector of index k has a length $l_k$, and divide the upper triangular matrix R into N upper-triangular sub-matrices $R^{(k)}$ and $$\frac{N(N-1)}{2}$$

rectangular sub-matrices $B^{(kj)}$, k=1, ..., N, j=k+1, ..., N.

Using the sub-vectors $s^{(k)}$ and $y^{(k)}$ and the divided sub-matrices $R^{(k)}$ and $B^{(kj)}$, a set of sub-blocks $(SB)_k$ may be defined. For each index k=1, ..., N−1, a sub-block $(SB)_k$ may be defined as $(SB)_k=\{l_k, s^{(k)}, R^{(k)}, \tilde{y}^{(k)}, \tilde{w}^{(k)}, D^{(k)}, B^{(kj)}, j=k+1, ..., N\}$. For k=N, the corresponding sub-block is given by $(SB)_N=\{l_N, s^{(N)}, R^{(N)}, \tilde{y}^{(N)}, \tilde{w}^{(N)}, D^{(N)}\}$.

The decoding unit 311 may further comprise N symbol estimation units 403 and N−1 successive interference cancellation units 405 (designated by "SIC units" hereinafter). A SIC unit 405 may be associated with a sub-block $(SB)_k$ and may be configured to calculate a vector $\bar{y}^{(k)}$. A symbol estimation unit 403 may be associated with each sub-block $(SB)_k$ to determine an estimate $\hat{s}^{(k)}$ using a symbol estimation algorithm $D^{(k)}$. The decoding unit 311 may further comprise a serial converter 407 configured to determine the real-value vector $\hat{s}_t=[\hat{s}^{(1)}, \hat{s}^{(2)}, ..., \hat{s}^{(N)}]^t$ by aggregating the outputs of the N symbol estimation units.

The symbol estimation algorithms $D^{(k)}$ for k=1, ..., N may be similar or may comprise at least two different algorithms.

In an application of the invention to a wireless Rayleigh fading multiple antenna system (single-user MIMO), the signal to be decoded may be sent:

from a transmitter, equipped with $n_t$ transmit antennas using a spatial multiplexing scheme and $2^q$-QAM modulation, to a receiver, equipped with $n_r$ receive antennas with $n_r \geq n_t \geq 2$.

The received complex-value signal may be written in the form:

$$y_c = H_c s_c + w_c \quad (7)$$

In equation (7), $y_c$ is a $n_r$-dimensional vector, $s_c$ denotes the complex-value vector of transmitted information symbols of dimension $n_t$. The complex-value $n_r \times n_t$ matrix $H_c$ represents the channel matrix comprising the fading gains. In a Rayleigh fading channel, the entries of the channel matrix $H_c$ are of independent identically distributed (i.i.d) complex Gaussian-type. The channel matrix may be estimated in coherent transmissions at the receiver using estimation techniques such as least square estimators. In addition to the multipath fading effects, the transmission channel may be noisy. The noise may result from the thermal noise of the system components, inter-user interference and intercepted interfering radiation by antennas. The total noise may be modeled by a zero-mean Additive White Gaussian Noise of variance $\sigma^2$ per real-value dimension modeled in equation (7) by the $n_r$-dimensional complex-value vector $w_c$.

Given the channel output, the receiver may attempt to generate an estimate of the original vector of information symbols.

Figure 5:
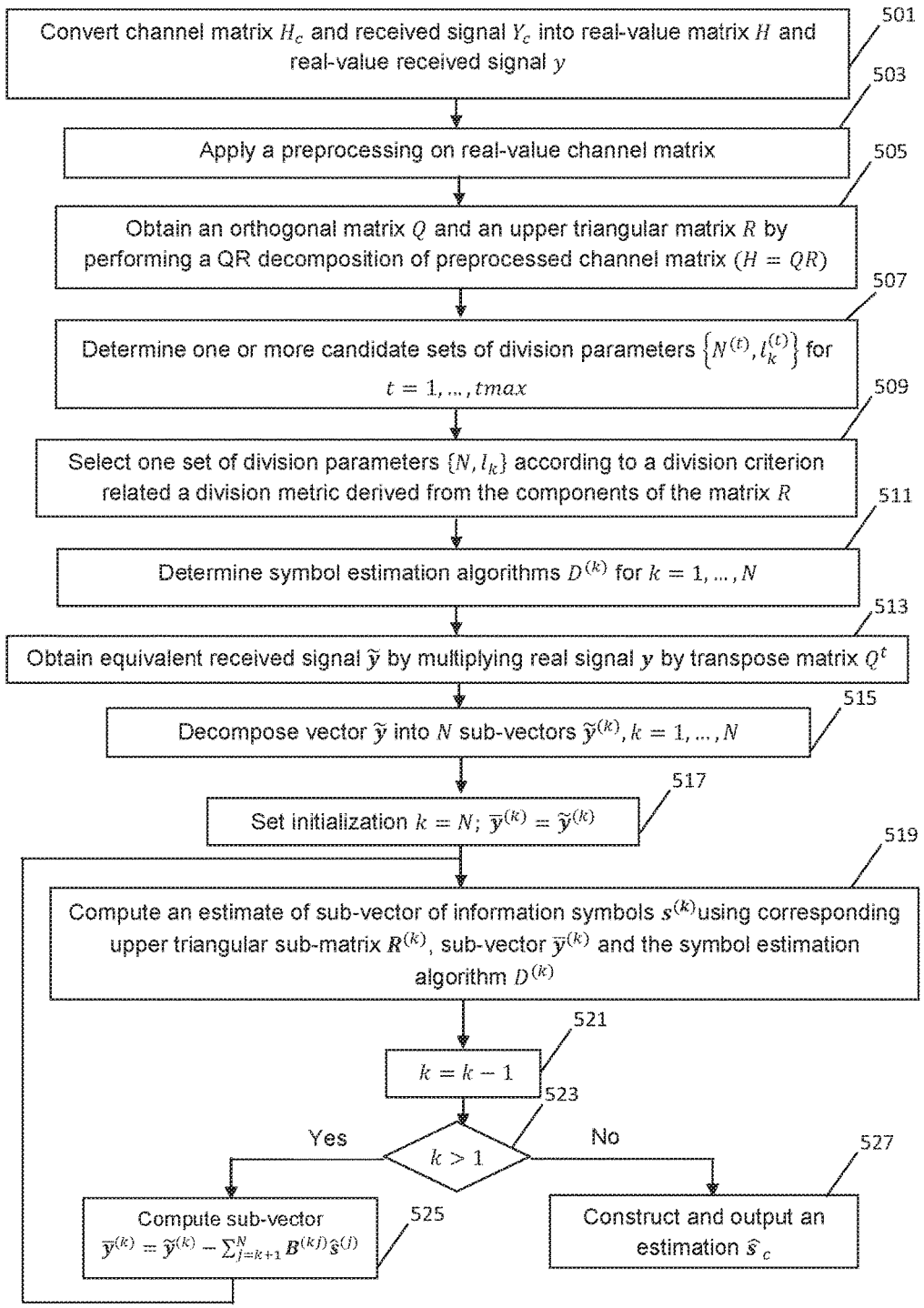
FIG. 5 is a flowchart depicting a method of sub-block decoding, according to some embodiments.

FIG. 5 is a flowchart depicting a decoding method, according to some embodiments in which a QR-based recursive sub-block decoding is considered. The sub-block decoding method may be implemented in the Space-Time decoder 211.

At step 501, a complex-to-real conversion may be performed to determine a real-value form of the received signal.

For example, in one embodiment using a spatial multiplexing scheme, the system in equation (7) may be transformed into:

$$y = \begin{bmatrix} \text{Re}(y_c) \\ \text{Im}(y_c) \end{bmatrix} = \begin{bmatrix} \text{Re}(H_c) & -\text{Im}(H_c) \\ \text{Im}(H_c) & \text{Re}(H_c) \end{bmatrix} \begin{bmatrix} \text{Re}(s_c) \\ \text{Im}(s_c) \end{bmatrix} + \begin{bmatrix} \text{Re}(w_c) \\ \text{Im}(w_c) \end{bmatrix} \quad (8)$$

The Re(·) and Im(·) operators in equation (8) designate the real and imaginary parts of each element composing the underlying vector or matrix.

Equation (8) can be written in the form:

$$y = Hs + w \quad (9)$$

To facilitate the understanding of the following embodiments, the following description will be made with reference to a spatial multiplexing scheme and involving a symmetric MIMO configuration where the transmitter and receiver are equipped with the same number of antennas $n_t = n_r$, for illustration purposes only. Accordingly, the real-value vectors y, s and w in equation (9) will be represented as n-dimensional vectors with $n = 2n_t = 2n_r$ and the equivalent real-value channel matrix H will be represented by a square $n \times n$ matrix. The vector s comprises the real and imaginary parts of the original complex information symbols composing the vector $s_c$.

At step 503, a preprocessing of the real-value channel matrix may be performed. One or more preprocessing techniques such as a lattice reduction, an MMSE-GDFE filtering, and an ordering of the columns and/or rows of the real-value channel matrix may be applied, separately or in combination.

At step 505, an upper triangular matrix R of dimension $n \times n$ and an orthogonal matrix Q of dimension $n \times n$ may be obtained by applying a QR decomposition to the real-value channel matrix such that H=QR. In embodiments using preprocessing techniques, the QR decomposition may be applied to the preprocessed channel matrix. The system in equation (9) can accordingly be written as:

$$y = QRs + w \qquad (10)$$

In an application of the invention to recursive sub-block decoding, a sub-block decoding may be performed to recover at least an estimation of the original information symbols. Sub-block decoding is based on a division of the upper triangular matrix into sub-matrices and a division of the real-value vector s into sub-vectors. Each sub-vector of information symbols is decoded separately given the corresponding divided sub-matrix, the previously decoded sub-vectors of symbols, and the corresponding symbol estimation algorithm.

Embodiments of the invention provide efficient sub-block division techniques for determining a set of division parameters used to perform a division of the upper triangular matrix which enables a minimization of the interference between the sub-vectors of information symbols, and an optimization of the tradeoffs between the sub-block decoding computational complexity and the decoding error performances.

Step 507 may be performed to determine at least one candidate set of division parameters $\{N^{(t)}, l_k^{(t)}\}$ for t=1, . . . , tmax, with tmax being a predefined number designating the number of candidate sets of division parameters.

A candidate set of division parameters may be associated with a division of the real-value vector s into $N^{(t)}$ sub-vectors $s^{(k,t)}$ as expressed in equation (2), where the $k^{th}$ sub-vector $s^{(k,t)}$ comprising $l_k^{(t)}$ symbols according to equation (3).

In addition to the division of the vector of information symbols, a candidate set of division parameters may be associated with a candidate division of the upper triangular matrix into $N^{(t)}$ upper triangular sub-matrices $R^{(k,t)}$ and $$\frac{N^{(t)}(N^{(t)} - 1)}{2}$$

rectangular sub-matrices $B^{(jk,t)}$ according to equation (4).

For a given candidate set of division parameters $\{N^{(t)}, l_k^{(t)}\}$, each pair of sub-vectors $s^{(j,t)}$ and $s^{(k,t)}$ for k>j may be associated with a rectangular sub-matrix $B^{(jk,t)}$, the rectangular sub-matrix corresponding to the interference between the sub-vectors $s^{(j,t)}$ and $s^{(k,t)}$.

In some embodiments, a division metric $SM^{(t)}(s^{(j,t)}, s^{(k,t)})$ may be associated with each pair of sub-vectors $(s^{(j,t)}, s^{(k,t)})$, the division metric being derived from the components of the upper triangular matrix, and more specifically from the components of the rectangular sub-matrix $B^{(jk,t)}$ associated with the sub-vectors vectors $s^{(j,t)}$ and $s^{(k,t)}$.

In some embodiments, a division metric $SM^{(t)}(s^{(j,t)}, s^{(k,t)})$ may be derived as the ratio between:
the number of the components of the rectangular sub-matrix $B^{(jk,t)}$ having an absolute value lower than or equal to a reference value $R_{th}$, and
the total number of components of the sub-matrix $B^{(jk,t)}$.

The reference value $R_{th}$ may be any positive real number higher than or equal to zero (0).

According to some embodiments, the division metric may represent the zero structure of the rectangular sub-matrices and indicate the sparsity rate or sparsity level of the rectangular sub-matrices. The higher the sparsity rate per rectangular sub-matrix, the lower the impact of the error propagation due to the interference between the sub-vectors of information symbols. In such embodiments, the reference value $R_{th}$ may be equal to zero (0), the corresponding division metric being referred to as a 'hard sparsity rate'.

According to other embodiments, the reference value $R_{th}$ may be a non-zero positive real number, the corresponding division metric being referred to as a 'soft sparsity rate'.

According to some embodiments, the reference value $R_{th}$ may be the same for all the rectangular sub-matrices $B^{(jk,t)}$ for $1 \leq j < k \leq N^{(t)}$.

In other embodiments, the reference value $R_{th}$ may be different for at least some of the rectangular sub-matrices $B^{(jk,t)}$ for $1 \leq j < k \leq N^{(t)}$.

Step 509 may be performed to select one set of division parameters $\{N, l_k\}$, among the candidate set(s) of division parameters according to a selection criterion depending on the division metrics associated with the sub-vectors of information symbols. The selection criterion may correspond to an optimization of the division metrics over all the candidate sets of division metrics.

In one embodiment, the selection criterion may correspond to the maximization of the division metrics $SM^{(t)}(s^{(j,t)}, s^{(k,t)})$ over all the rectangular sub-matrices provided by all the candidate sets of division parameters. Accordingly, step 509 may be performed to select, among the candidate sets of division parameters $\{N^{(t)}, l_k^{(t)}\}$, for t=1, . . . , tmax, the candidate set of division parameters such that the minimum value of the division metrics $SM^{(t)}(s^{(j,t)}, s^{(k,t)})$ associated with the pairs of sub-vectors $(s^{(j,t)}, s^{(k,t)})$ is maximized according to equation (5).

In another embodiment, the selection criterion may depend on the value of the division metrics $SM^{(t)}(s^{(j,t)}, s^{(k,t)})$ with respect to a division metric thresholds $SM_{th}$. Step 509 may be accordingly performed to select, among the candidate sets of division parameters $\{N^{(t)}, l_k^{(t)}\}$, for t=1, . . . , tmax, the candidate set of division parameters associated with the maximum number of the division metrics $SM^{(t)}(s^{(j,t)}, s^{(k,t)})$ being higher than or equal to a division metric threshold according to equation (6).

According to some embodiments, the division metric threshold may depend on a target quality of service specification when applied to recursive sub-block decoding.

According to some embodiments, the target quality of service may be related to the outage capacity of the transmission channel and/or on the achievable transmission rate.

Further, in some embodiments, the division metric threshold may depend on the standard deviation of the noise w affecting the transmission channel.

In one embodiment, the division metric threshold may be the same for the division metrics $SM^{(t)}(s^{(j,t)}, s^{(k,t)})$ associated with all the pairs of sub-vectors $(s^{(j,t)}, s^{(k,t)})$ for $1 \leq j < k \leq N^{(t)}$.

In another embodiment, the division metric threshold may be different for at least some of the division metrics $SM^{(t)}(s^{(j,t)}, s^{(k,t)})$ associated with at least some pairs of sub-vectors $(s^{(j,t)}, s^{(k,t)})$ for $1 \leq j < k \leq N^{(t)}$. For example, the division metric thresholds may depend on the position of the sub-vectors $s^{(j,t)}$ and/or $s^{(k,t)}$ within the real-value vector of information symbols s. Accordingly, for example, a large value (respectively a small value) of a division metric threshold may be considered for the division metrics associated with the pairs of sub-vectors $(s^{(j,t)}, s^{(k,t)})$ of indices $$\frac{n}{2} \leq j < k \leq N^{(t)}$$

respectively of indices $$1 \leq j < k \leq \frac{n}{2}).$$

Step 511 may be performed to determine a symbol estimation algorithm $D^{(k)}$ for k=1, . . . , N.

According to some embodiments, the symbol estimation algorithms $D^{(k)}$ may be selected from one or more symbol estimation algorithms previously determined or loaded from storage means.

According to some embodiments, the symbol estimation algorithm(s) may be previously determined, depending on a signal-to-noise ratio and/or on the computational capabilities of devices or systems implementing the sub-block decoding method. Further, the symbol estimation algorithm(s) may be previously determined depending on a target quality of service metric that is required such as an outage capacity of the transmission channel and/or a target achievable transmission rate.

According to one embodiment, the symbol estimation algorithms $D^{(k)}$ may be similar.

According to another embodiment, the symbol estimation algorithms $D^{(k)}$ may be different.

In some embodiments, a symbol estimation algorithm may be chosen in the group consisting of a sequential algorithm, a linear decoding algorithm such as the ZF or the MMSE decoders, or a non-linear ZF-DFE decoder.

In application to QR-based sub-block decoding, the system in equation (10) may be first transformed at step 513 into:

$$\tilde{y}=Q^t y=Rs+\tilde{w} \quad (11)$$

In equation (11), $\tilde{w}=Q^t w$ designates a scaled noise vector. Given the orthogonality of the matrix Q, the system in equation (11) is equivalent to the one given in equation (10).

The real-value equivalent system of equation (11) may be considered for the estimation of the originally transmitted information symbols.

ML decoding of the information symbols can be formalized by the optimization problem given by:

$$\hat{s}_{ML}=\text{argmin}_{s \in A^n}\|\tilde{y}-Rs\|^2 \quad (12)$$

In equation (12), A designates the alphabet to which the real and imaginary parts of the complex-value vector $s_c$ composing the real vector s belong to. An ML metric maybe defined in relation with the ML decoding problem as:

$$m(s)=\|\tilde{y}-Rs\|^2 \quad (13)$$

Given the selected set of division parameters, step 515 may be first performed to divide the vector $\tilde{y}$ into N sub-vectors such that $$\tilde{y} = \begin{bmatrix} \tilde{y}^{(1)} \\ \vdots \\ \tilde{y}^{(N)} \end{bmatrix}.$$

A sub-vector $\tilde{y}^{(k)}$ of index k, for k=1, ..., N has a lengths $l_k$. Similarly, a sub-vector division may be applied to the real-value vector of information symbols s and to the noise vector $\tilde{w}$ to determine N sub-vectors $s^{(k)}$ and N sub-vectors $\tilde{w}^{(k)}$ of lengths $l_k$ such that $$s = \begin{bmatrix} s^{(1)} \\ \vdots \\ s^{(N)} \end{bmatrix} \text{ and } \tilde{w} = \begin{bmatrix} \tilde{w}^{(1)} \\ \vdots \\ \tilde{w}^{(N)} \end{bmatrix}.$$

The division of the vectors $\tilde{y}$, s and $\tilde{w}$ may be performed in accordance with a division of the upper triangular matrix R into sub-matrices according to $$R = \begin{bmatrix} R_{11} & \cdots & R_{1,n-1} & R_{1n} \\ 0 & \vdots & \vdots & \vdots \\ 0 & 0 & R_{n-1,n-1} & R_{n-1,n} \\ 0 & 0 & 0 & R_{nn} \end{bmatrix} = \begin{bmatrix} R^{(1)} & \cdots & B^{(1N-1)} & B^{(1N)} \\ 0 & \cdots & \vdots & \vdots \\ 0 & 0 & R^{(N-1)} & B^{(N-1N)} \\ 0 & 0 & 0 & R^{(N)} \end{bmatrix} \quad (14)$$

In equation (14):

a square upper triangular sub-matrix $R^{(k)}$ is of dimension $l_k \times l_k$; and a sub-matrix $B^{(kj)}$ is of dimension $l_k \times l_j$ for j=k+1, ..., N.

The selected set of division parameters, the symbol estimation algorithms, the divided sub-matrices $R^{(k)}$ and $B^{(kj)}$ of the upper triangular matrix R, and the divided sub-vectors $\tilde{y}^{(k)}$ may be grouped into sub-blocks $(SB)_k$, k=1, ..., N. A sub-block $(SB)_k$, for k=1, ..., N-1, may be defined by a set of parameters such that $(SB)_k=\{l_k, s^{(k)}, R^{(k)}, \tilde{y}^{(k)}, \tilde{w}^{(k)}, D^{(k)}, B^{(kj)}, j=k+1, \ldots, N\}$, where:

$$\tilde{y}^{(k)}=R^{(k)}s^{(k)}+\Sigma_{j=k+1}^N B^{(kj)}s^{(j)}+\tilde{w}^{(k)} \quad (15)$$

For k=N, the sub-block of index N may be defined by $(SB)_N=\{l_N, s^{(N)}, \tilde{y}^{(N)}, \tilde{w}^{(N)}, D^{(N)}\}$ such that:

$$\tilde{y}^{(N)}=R^{(N)}s^{(N)}+\tilde{w}^{(N)} \quad (16)$$

Systems in equations (15) and (16) may be used for the decoding of the various sub-vectors of information symbols.

According to such groups of sub-blocks, the ML decoding metric in equation (12) may be written as:

$$m(s)=\|\tilde{y}-Rs\|^2=\|\Sigma_{k=1}^N \tilde{y}^{(k)}-(R^{(k)}s^{(k)}+\Sigma_{j=k+1}^N B^{(kj)}s^{(j)})\|^2 \quad (17)$$

Accordingly, a sub-block estimation of the original sub-vectors of symbols $s^{(k)}$, k=N, N-1, ..., 1 may be performed, recursively, at steps 517 to 525. An initialization may be performed at step 517, corresponding to k=N.

Step 519 may be repeated for each sub-block $(SB)_k$, k=N, N-1, ... 1 to determine a sub-vector estimation $\hat{s}^{(k)}$ of the sub-vector of symbols $s^{(k)}$ of the real-value vector s. For each k=N-1, ... 1, a sub-vector $\bar{y}^{(k)}=\tilde{y}^{(k)}\Sigma_{j=k+1}^N B^{(kj)}\hat{s}^{(j)}$ may be computed at step 525 from the previously estimated sub-vectors $\hat{s}^{(j)}$ and the rectangular sub-matrices $B^{(kj)}$, j=k+1, ..., N. An estimate of the sub-vector of index k may be determined using the symbol estimation algorithm $D^{(k)}$, the upper triangular matrix $R^{(k)}$, and the calculated sub-vector $\bar{y}^{(k)}$. For k=N, the estimate $\hat{s}^{(N)}$ may be determined using the corresponding symbol estimation algorithm $D^{(N)}$, the corresponding upper triangular sub-matrix $R^{(N)}$ and the vector $\bar{y}^{(N)}=\tilde{y}^{(N)}$ initialized at step 517.

If it is determined at step 523 that all the sub-vectors of symbols have been estimated, step 527 may be performed to construct an output, from the sub-vectors $\hat{s}^{(k)}$, k=1, ..., N, as an estimation $\hat{s}_c$ of the complex-value vector of information symbols $s_c$. The construction step may comprise two phases. First, a real-value vector $\hat{s}=[\hat{s}^{(1)}, \ldots, \hat{s}^{(N)}]^t$ may be constructed by aggregating the different sub-vector estimates. Then, the obtained vector $\hat{s}$ may be converted into the complex-value vector $\hat{s}_c=[\hat{s}_1, \hat{s}_2, \ldots, \hat{s}_{n/2}]^t$ such that a component $\hat{s}_j$ for j=1, ..., n/2 is given by:

$$\hat{s}_j=(\hat{s})_j+i(\hat{s})_{j+n/2} \quad (18)$$

In equation (18), $(u)_j$ denotes the $j^{th}$ element of a vector u.

In an embodiment in which a sequential decoder is used in a given sub-block $(SB)_k$, the corresponding symbol estimation algorithm $D^{(k)}$ may deliver an estimate $\hat{s}^{(k)}$ by minimizing the sub-block metric $m(s^{(k)})=\|\bar{y}^{(k)}-R^{(k)}s^{(k)}\|^2$ according to:

$$\hat{s}^{(k)} = \mathrm{argmin}_{s^{(k)} \in A^{l_k}} \, m(s^{(k)}) = \underset{s^{(k)} \in A^{l_k}}{\mathrm{argmin}} \|\bar{y}^{(k)} - R^{(k)} s^{(k)}\|^2 \qquad (19)$$

Sequential tree-search algorithms such as the Sphere Decoder (SD), the Stack decoder and the SB-Stack decoder (SB-Stack), may be used to solve equation (159.

Further, in some embodiments, a preprocessing on the upper triangular sub-matrices $R^{(k)}$, prior to decoding, may be performed using for example a lattice reduction and/or an MMSE-GDFE filtering. Preprocessing methods may be also applied to the channel matrix prior to sub-block division and decoding.

Figure 6:
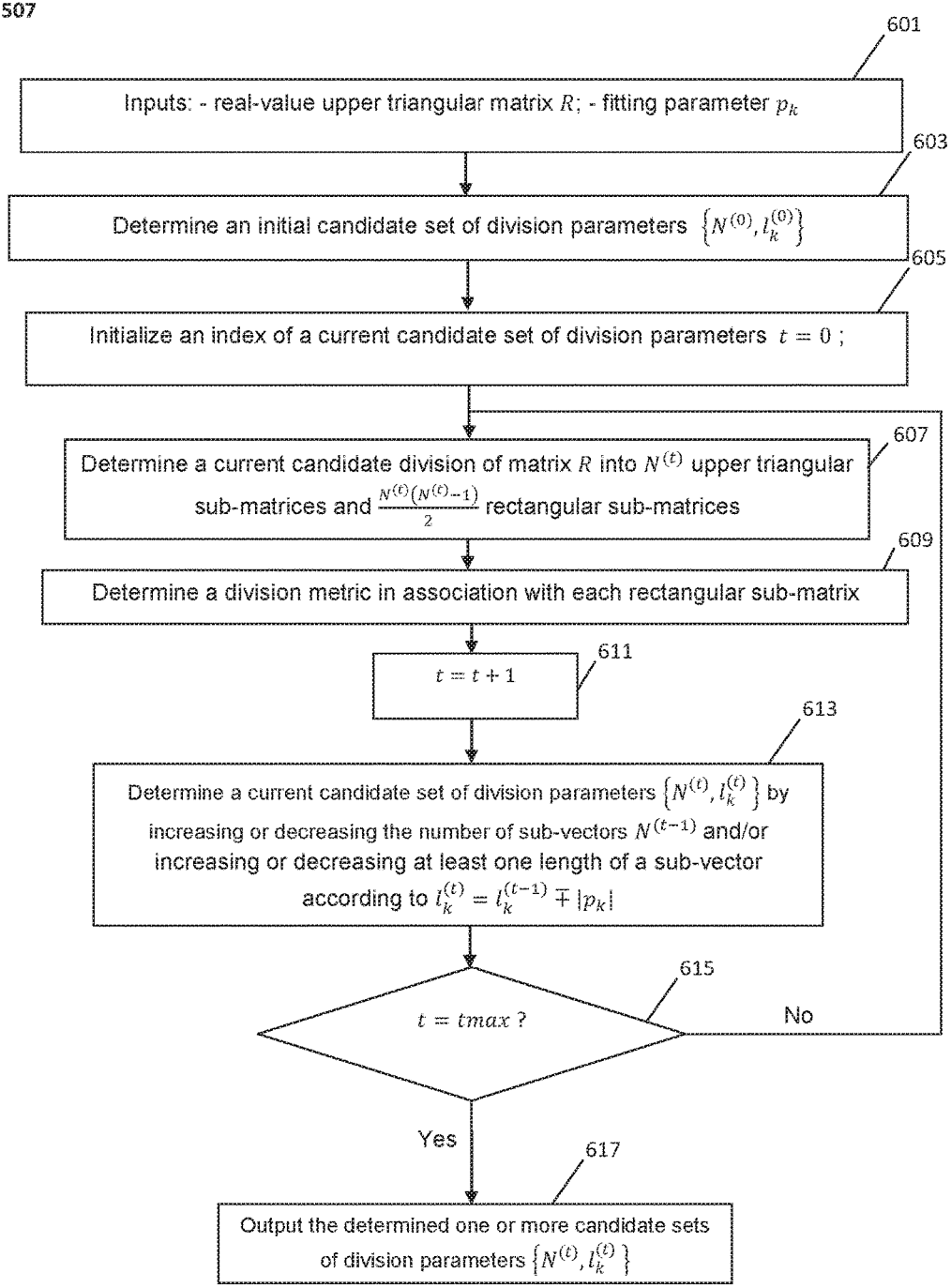
FIG. 6 is a flowchart depicting a method of determining one or more candidate sets of division parameters for sub-block decoding, according to some embodiments.

FIG. 6 is a flowchart depicting a method of determining a set of division parameters, according to some embodiments based on an iterative determination of a current candidate set of division parameters and on an update of the current candidate set of division parameters. The update of a current set of division parameters may be based on a fitting parameter, said fitting parameter being an integer number.

Step 601 may be performed to receive inputs. The inputs may comprise the real-value upper triangular matrix R and one or more fitting parameters.

Further, the determination of at least one current candidate set of division parameters may be performed based on an initial candidate set of division parameters.

Accordingly, step 603 may be performed to determine an initial candidate set of division parameters $\{N^{(0)}, l_k^{(0)}\}$.

According to some embodiments, the initial candidate set of division parameters may be determined depending on the one or more symbol estimation algorithms previously stored in storage means.

For example, in embodiments in which the symbol estimation algorithms comprise linear or non-linear decoding algorithms, the initial candidate set of division parameters may comprise a number of sub-vectors equal to $N^{(0)}=n$ associated with an initial division of the vector of information symbols s into n sub-vectors such that the length of each sub-vector is equal to $l_k^{(0)}=1$, for $k=1, \ldots, n$.

In another example, in embodiments in which the symbol estimation algorithms comprise sequential decoding algorithms, the initial candidate set of division parameters may comprise a number of sub-vectors equal to $N^{(0)}=1$ providing a single sub-vector of length $l_1^{(0)}=n$.

Step 605 may be performed to initialize an index of a current candidate set of division parameters to $t=0$.

Steps 607 to 615 may be performed to execute tmax iterations, each iteration providing a current candidate set of division parameters corresponding to one candidate set of division parameters.

Step 607 may be performed to determine a current candidate division of the upper triangular matrix R into sub-matrices $N^{(t)}$ upper triangular sub-matrices and $$\frac{N^{(t)}(N^{(t)} - 1)}{2}$$

rectangular sub-matrices.

Step 609 may be performed to determine, for the current candidate set of division parameters $\{N^{(t)}, l_k^{(t)}\}$, a division metric $SM^{(t)}(s^{(j,t)}, s^{(k,t)})$ in association with each pair of sub-vectors $(s^{(j,t)}, s^{(k,t)})$.

Step 611 may be performed to increment the index of the current candidate set of division parameters as $t=t+1$.

Step 613 may be performed to determine a current candidate set of division parameters $\{N^{(t)}, l_k^{(t)}\}$ by updating the number of sub-vectors $N^{(t-1)}$ and/or updating the length of at least one sub-vector $l_k^{(t-1)}$, both comprised in a previous candidate set of division parameters $\{N^{(t-1)}, l_k^{(t-1)}\}$ determined at a previous step of the iterative method.

Given the initial candidate set of division parameters, a current candidate set of division parameters of index $t=1$ may correspond to an update of the initial candidate set of division parameters $\{N^{(0)}, l_k^{(0)}\}$.

According to some embodiments, an update of a current candidate set of division parameters may comprise increasing or decreasing the current candidate number of sub-vectors and/or increasing or decreasing the number of information symbols comprised in at least one sub-vector of symbols associated with the current candidate set of division parameters.

In some embodiments, the update of a current candidate set of division parameters may be based on one or more fitting parameters $p_k$ for $k=1, \ldots, N^{(t)}$. The fitting parameters may be positive-value or negative-value such that $1 \le |p_k| \le n-1$.

Accordingly, determining a current candidate length of sub-vector $l_k^{(t)}$ may be performed by increasing (respectively decreasing) the value of the previous candidate length of sub-vector $l_k^{(t-1)}$ determined at a previous iteration, using a fitting parameter $p_k$ such that $l_k^{(t)}=l_k^{(t-1)}+|p_k|$ (respectively $l_k^{(t)}=l_k^{(t-1)}+|p_k|$). The fitting parameters used during an iteration should satisfy the condition expressed by $\Sigma_{k=1}^{N^{(t)}}=0$.

The step of determining a current candidate number of sub-vectors $N^{(t)}$ may be performed by increasing or decreasing the candidate number of sub-vectors $N^{(t-1)}$ corresponding to a previous iteration. Moreover, a candidate number of sub-vectors may be updated according to the update of the current lengths of sub-vectors.

If it is determined at step 615 that the maximum number of iterations tmax is reached, step 617 may be performed to output the determined current candidate sets of division parameters as the candidate set(s) of division parameters.

If it is determined at step 615 that the maximum number of iterations is not reached, steps 607 to 613 may be repeated to determine a current candidate set of division parameters.

Although embodiments of the invention have been described mainly with reference to an application of the invention to MIMO systems using spatial multiplexing of information symbols, it should be noted that the invention is also applicable to configurations using linear Space-Time Block codes. In the presence of a Space-Time Block code of length T and encoding κ symbols, the real-value expression of the channel output can be written in the linear representation form of equation (6) where the equivalent channel matrix is the real-value $2n_r T \times 2\kappa$ matrix $H_{eq}$ given by:

$$H_{eq} = (I_T \otimes H)G \qquad (20)$$

The $2n_r T \times 2\kappa$ matrix G designates a real-value matrix known as a generator matrix or coding matrix of the linear Space-Time Block code. $I_T$ denotes the identity matrix of dimension T and the operator $\otimes$ is the Kronecker matrices product.

Furthermore, while embodiments of the invention have been described manly with reference to symmetric MIMO configurations characterized by a same number of transmit and receive antennas, it should be noted that the invention may also be applied to asymmetric MIMO configurations with $n_t < n_r$. A linear representation in the form of equation (6) can also be obtained by performing the complex-to-real conversion of step 601 to the equivalent system given by:

$$U^\dagger y_c = DV^\dagger s_c + U^\dagger w_c \qquad (21)$$

In equation (21), the matrices U and V are unitary matrices obtained, together with matrix D, from the singular value decomposition of the matrix $H_c = UDV^t$. D is a diagonal matrix having positive diagonal entries representing the singular values of the matrix $H_c$. The superscript $(\cdot)^\dagger$ designates the Hermitian transposition operator.

Further, embodiments of the invention are not limited to particular types of sub-block decoding, and can be applied to any other types of recursive sub-block decoding, such as Semi-exhaustive Recursive Sub-Block decoding disclosed in the European patent application N° 15306808.5. Further, the embodiments of the invention may both apply to hard and soft decoding.

In an application of the invention to soft-output decoding, the decoding methods and devices according to some embodiments allow generating a list of estimates of the original vector of information symbols. The list thus obtained can be used to calculate the log likelihood ratio values for approximating the extrinsic information of the different information bits carried by the original information symbols. Several iterations of steps 517 to 527 may be performed, in order to fill the list of estimates.

The methods and devices described herein may be implemented by various means, for example in hardware, software, or a combination thereof. In a hardware implementation, the processing elements of a Space-Time decoder 211 can be implemented for example according to a hardware-only configuration (for example, in one or more FPGA, ASIC or VLSI integrated circuits with the corresponding memory) or according to a configuration using both VLSI and DSP.

Figure 7:
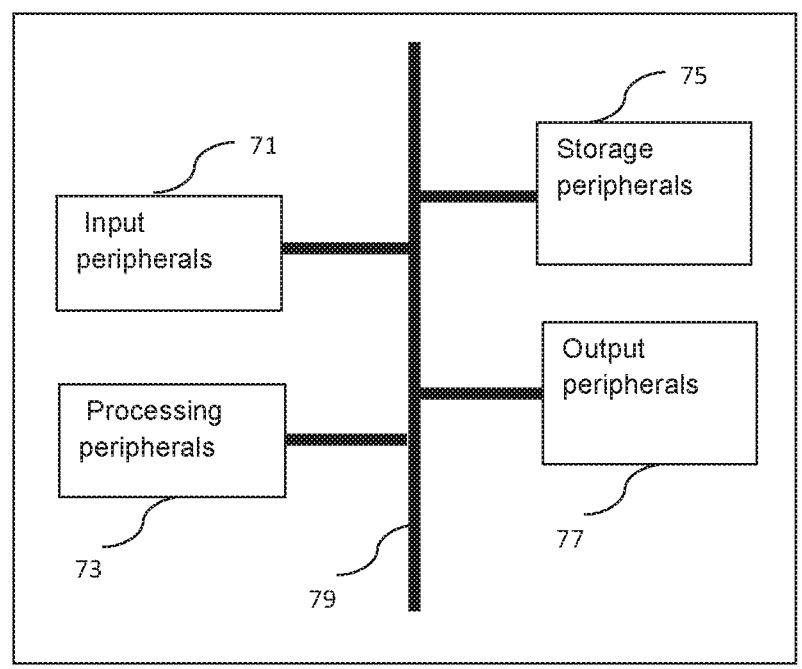
FIG. 7 illustrates a hardware architecture of a Space-Time decoder according to some embodiments.

FIG. 7 represents an exemplary hardware architecture of the Space-Time decoder 211, according to certain embodiments of the invention. The hardware architecture may be implemented in a machine or computer executed device. As illustrated, the Space-Time decoder 211 may include various computing, storage and communication units possibly interacting with each another through a data and address port 79 and comprising:

Input peripherals 71 for receiving for example input data from the receive antennas 209;

Processing peripherals 73 comprising one or more microprocessors (CPU) such as an FPGA or an ASIC configured for instance to execute the corresponding instructions to run the methods and algorithms according to the embodiments of the invention;

Storage peripherals 75 possibly comprising a random access memory (RAM) or a read-only memory to store for example the candidate sets of division parameters and the division metric thresholds.

Output peripherals 77 comprising communication means such as displays enabling for example man-to-machine interaction between the receiver device 21 and a MIMO system administrator for configuration and maintenance purposes.

Further, while some embodiments of the invention have been described in relation to a wireless single-user MIMO system, it should be noted that the invention is not limited to such an application. The invention may be integrated in any receiver device operating in any linear communication system characterized by a linear representation of the channel output. The communication system may be wired, wireless or optical fiber-based accommodating single or multiple users, using single or multiple antennas, and single or multi-carrier communication techniques. For example, the present invention may be integrated in a receiver device implemented in a wireless distributed MIMO system. Distributed MIMO may be used for example in cellular communications applied in 3G, 4G, LTE, and future 5G standard or the like. Cooperative communications applied for example in ad-hoc networks (wireless sensor networks, machine-to-machine communications, internet of things (IoT), etc) are also examples of distributed MIMO systems. In addition to wireless networks, the present invention may be integrated in optical receiver devices implemented in optical fiber-based communication systems, such as Polarization Division Multiplexing-OFDM (PDM-OFDM) systems.

Further, the invention is not limited to communication devices and may be integrated into signal processing devices such as electronic filters of finite impulse response (FIR) used in audio applications like audio crossovers and audio mastering. Accordingly, some embodiments may be used to determine an estimate of an input sequence, given an output sequence of a FIR filter of order M.

In another application, methods, devices and computer program products according to some embodiments of the invention may be implemented in a Global Navigation Satellite System (GNSS), such as IRNSS, Beidou, GLONASS, Galileo; GPS comprising for instance at least a GPS receiver for estimating positioning parameters using for example carrier phase measurements.

Further, methods, devices and computer program products according to some embodiments of the invention may be implemented in cryptographic systems for determining estimates on private secret values used in a cryptographic algorithm for encrypting/decrypting data or messages during their storage, processing or communication. In lattice-based cryptography applications, data/messages are encrypted in the form of lattice points. The decryption of such encrypted data may be advantageously performed according to some embodiments of the invention, enabling for a high probability of success recovery of secret values with a reduced complexity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A decoder for decoding a signal received through a transmission channel in a communication system, said signal comprising a vector of information symbols, wherein the decoder comprises:

a processing unit configured to determine at least one candidate set of division parameters and to perform a division of said vector of information symbols into a set of sub-vectors in association with each candidate set of division parameters, each pair of sub-vectors being associated with a division metric;

a selection unit configured to select one of said candidate sets of division parameters according to a selection criterion depending on said division metric; and a decoding unit configured to determine at least one estimate of each sub-vector associated with said selected set of division parameters by applying a symbol estimation algorithm, wherein the decoder is configured to determine at least one estimate of the vector of information symbols from said at least one estimate of each sub-vector of information symbols.

2. The decoder of claim 1, wherein the transmission channel is represented by an upper triangular matrix, the processing unit being further configured to determine, for each candidate set of division parameters, a candidate division of said upper triangular matrix into at least two sub-matrices in association with the division of the vector of information symbols, each pair of sub-vectors being further associated with a rectangular sub-matrix from said at least two sub-matrices, the division metric associated with each pair of sub-vectors being derived from the components of the rectangular sub-matrix determined for the candidate set of division parameters.

3. The decoder of claim 2, wherein the division metric is a ratio between:
the number of the components comprised in the rectangular sub-matrix that have an absolute value lower than or equal to a reference value, and
the total number of components comprised in the rectangular sub-matrix,
said reference value being a positive real number higher than or equal to zero.

4. The decoder of claim 3, wherein the reference value is equal to zero.

5. The decoder of claim 1, wherein said selection criterion comprises:
determining, for each candidate set of division parameters, a reference division metric corresponding to the lowest division metric value among the division metrics associated with the pairs of sub-vectors of the set of sub-vectors associated with the candidate set of division parameters,
determining, among the candidate sets of division parameters, the candidate set of division parameters that has the highest value of the reference division metric.

6. The decoder of claim 1, wherein said selection criterion comprises selecting the candidate set of division parameters which is associated with a maximum number of division metrics that satisfy a metric condition related to a metric threshold, the metric condition being satisfied for a given division metric associated with a pair of sub-vectors if the given division metric is higher than or equal to said metric threshold.

7. The decoder of claim 6, wherein said metric threshold is different for each pair of sub-vectors.

8. The decoder of claim 6, wherein said metric threshold is the same for each pair of sub-vectors.

9. The decoder of claim 6, wherein the metric threshold is selected depending on a signal-to-noise ratio and/or on a transmission rate.

10. The decoder of claim 1, wherein the processing unit is configured to determine said at least one candidate set of division parameters iteratively, an iteration comprising:
determining a current candidate set of division parameters, said division of the vector of information symbols into a set of sub-vectors being performed for said current candidate set of division parameters; and
updating said current candidate set of division parameters by modifying at least one of the division parameters of the current candidate set of division parameters.

11. The decoder of claim 10, wherein the step of modifying at least one of the division parameters of the current candidate set of division parameters comprises increasing or decreasing at least one of the division parameters.

12. The decoder of claim 10, wherein the processing unit is previously configured to determine an initial candidate set of division parameters, said current set of division parameters being initially set to the initial candidate set of division parameters.

13. The decoder of claim 1, wherein the set of division parameters comprises:
at least two sub-vectors of information symbols, and/or
a length parameter for each sub-vector of information symbols, said length parameter being at least equal to one and representing the number of information symbols comprised in the sub-vector of information symbols.

14. The decoder of claim 1, wherein the decoding unit is configured to apply a different symbol estimation algorithm for determining said at least one estimate of each sub-vector of information symbols.

15. A method for decoding a signal received through a transmission channel in a communication system, said signal comprising a vector of information symbols, wherein the method comprises:
determining at least one candidate set of division parameters and performing a division of said vector of information symbols into a set of sub-vectors in association with each candidate set of division parameters, each pair of sub-vectors being associated with a division metric;
selecting one of said candidate sets of division parameters according to a selection criterion depending on said division metric; and
determining at least one estimate of each sub-vector associated with said selected set of division parameters by applying a symbol estimation algorithm,
wherein the method further comprises determining at least one estimate of the vector of information symbols from said at least one estimate of each sub-vector of information symbols.

* * * * *

UNITED STATES PATENT AND TRADEMARK OFFICE
CERTIFICATE OF CORRECTION

PATENT NO. : 10,250,360 B2
APPLICATION NO. : 15/836162
DATED : April 2, 2019
INVENTOR(S) : Asma Mejri, Ghaya Rekaya Ben-Othman and Mohammed-Achraf Khsiba It is certified that error appears in the above-identified patent and that said Letters Patent is hereby corrected as shown below:

In Column 26, Line 16, delete "step of"

Signed and Sealed this
Eleventh Day of June, 2019

Andrei Iancu
*Director of the United States Patent and Trademark Office*